United States Patent [19]

Furneaux et al.

[11] Patent Number: 4,921,823

[45] Date of Patent: May 1, 1990

[54] POROUS ANODIC ALUMINIUM OXIDE MEMBRANE CATALYST SUPPORT

[75] Inventors: Robin C. Furneaux, Shenington; Alexander P. Davidson, Shipston-on-Stour, both of England; Melville D. Ball, Kingston, Canada

[73] Assignee: Alcan International Limited, Montreal, Canada

[21] Appl. No.: 304,921

[22] Filed: Feb. 1, 1989

Related U.S. Application Data

[63] Continuation of Ser. No. 39,612, Apr. 16, 1987, abandoned.

[30] Foreign Application Priority Data

Apr. 16, 1986 [GB] United Kingdom ................. 8609249

[51] Int. Cl.$^5$ .......................... B01J 21/04; B01J 35/04
[52] U.S. Cl. ........................................ 502/4; 502/439
[58] Field of Search ............................ 502/4, 439, 527

[56] References Cited

U.S. PATENT DOCUMENTS 3,876,555  4/1975  Gryaznov et al. ...................... 502/4
4,598,056  7/1986  Barraud et al. ......................... 502/4

FOREIGN PATENT DOCUMENTS 2444541  6/1975  Fed. Rep. of Germany.

OTHER PUBLICATIONS

Rai et al., "Alumina Substrates with Cylindrical Parallel Pores", J. of Catalysis, No. 40, pp. 117–123 (1975).

Primary Examiner—W. J. Shine
Attorney, Agent, or Firm—Cooper & Dunham

[57] ABSTRACT

A catalyst device comprises a porous catalytically active inorganic membrane, means for presenting a fluid reactant to a first surface of the membrane and means for recovering a fluid reaction product from the second surface of the membrane. The membrane is preferably an anodic aluminum oxide membrane with a deposit of catalytically active material present within the pores, preferably concentrated in the ends of the pores adjacent the second surface of the membrane.

11 Claims, 1 Drawing Sheet

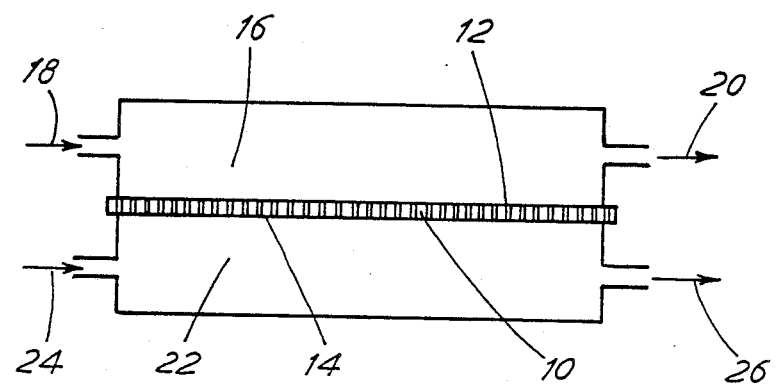

POROUS ANODIC ALUMINIUM OXIDE MEMBRANE CATALYST SUPPORT

This is a continuation of application Ser. No. 039,612, filed Apr. 16, 1987, now abandoned.

POROUS INORGANIC MEMBRANE CATALYST SUPPORT

This invention is concerned with the use of porous inorganic membranes, particularly anodic aluminium oxide membranes as catalyst supports Porous alumina ceramics are very well known and widely used as catalyst supports. Controlling catalytic activity by controlling the dimensions of the pores in which the catalyst is deposited is also well known. In use, gaseous reactants diffuse into and out of the pores in a random manner, and there is no inherent separation of reaction product from reactants.

Anodic aluminium oxide films have previously been used as catalyst supports, as described in Japanese Patent Specifications Nos. 53146988; 53022185 and 5350082. In all cases, the films have been used while still attached to the metallic substrate. Thus, pores in porous films are closed ended, and contact between reactants and catalysts deposited in a pore is achieved only by diffusion into and out of the same end of the pore.

K. N. Rai and E. Ruckenstein (Journal of Catalysis 40, (1975), 117 to 123) reports the preparation of anodic aluminium oxide membranes with cylindrical parallel pores, which are porous by virtue of not being attached to a metal substrate. The authors mention that the membranes may find application for systematic study of heterogeneous catalysis, since they can be tailor made with clearly defined pore geometries.

In one aspect, the invention provides a porous inorganic membrane wherein a deposit of a catalytically active material is present within the pores, the deposit being concentrated in the ends of the pores adjacent one surface of the membrane.

In another aspect, the invention provides a porous inorganic membrane having a system of larger pores extending in from one face and interconnecting with a system of smaller pores extending in from the other face, wherein catalytically active sites are present within the pores. The porous membrane may be a composite membrane comprising an inorganic membrane with relatively larger pores and an overlying inorganic film with relatively smaller pores.

These membranes are particularly suitable for use in a flow-through mode. Accordingly, in another aspect, the invention provides a catalyst device comprising a porous catalytically active inorganic membrane, means for presenting a fluid reactant to a first surface of the membrane and means for recovering a fluid reaction product from a second surface of the membrane.

In yet another aspect, the invention provides a method of performing a chemical reaction by the use of a porous catalytically active inorganic membrane, which method comprises presenting a fluid reactant to a first surface of the membrane and recovering a fluid reaction product from a second surface of the membrane.

Porous inorganic membranes, both symmetric and asymmetric, are described in the literature. For example, alumina and other metal oxide membranes can be made by a sol-gel technique as described by A. F. M. Leenaars et al in J. Mat. Sci., 19 (1984) 1077–1088; or by a tape casting technique as described by R. E. Mistler et al at p 411–448 of the book "Ceramics Processing before Firing", Ed. G. Y. Onoda et al, Wiley, N.Y., 1978. Preferably, an anodic aluminium oxide membrane is used.

When an aluminium substrate is anodised in certain electrolytes, e.g. dilute sulphuric acid, a porous anodic oxide film is formed on its surface consisting largely of amorphous alumina. The pores extend from the outer surface of the film to near the metal/oxide interface. The base of each pore is actually formed of a thin coherent layer of anodic oxide (the barrier oxide layer). The anodic oxide membrane can be separated from the metal substrate on which it was formed by several techniques: (1) by etching away the metal substrate with dilute hydrochloric acid; (2) by dissolving the metal substrate in bromine/methanol; (3) by attacking the oxide/metal interface with an aqueous solution of mercuric chloride, which causes the oxide membrane to "lift" away from the metal; (in all of the three preceding methods the barrier layer portion of the anodic film must be dissolved away by subsequent chemical treatment if a membrane with pores open at both ends is required); (4) by an electrochemical process which dissolves the barrier layer and separates the oxide membrane without destroying the substrate. All these techniques give rise to symmetric anodic oxide membranes having generally cylindrical pores extending from one surface to the other and of generally uniform diameter throughout their length.

EPA No. 178831 describes how porous membranes can be formed by separating conventional anodic aluminium oxide membranes from their metal substrate by a slow voltage reduction technique, designed to thin the barrier layer and eventually to dissolve any of the remaining barrier layer at the metal/oxide interface. The resulting asymmetric anodic aluminium oxide membranes have pores extending from one face of the membrane to the other, including a system of larger pores extending in from one face and a system of smaller pores extending in from the other face, the system of larger pores interconnecting with the system of smaller pores such that the inner ends of one or more smaller pores are joined to the inner end of a larger pore and there are substantially no blind larger pores. These membranes have advantageous properties for use as catalyst supports. In particular, they can be arranged to have high porosity, thus enabling good catalyst contact to be combined with high flow-through rates.

Anodic aluminium oxide membranes are typically from 0.1 to 100 microns thick. For use as catalyst supports in a flow-through mode, the membranes are usually at least 5 microns thick to provide the necessary strength. Pore diameters depend on anodising voltage, and are typically in the range of 10 to 2000 nm (1 nm = 1 nanometer = $10^{-3}$ microns = $10^{-9}$ m) for cylindrical pores. In asymmetric membranes of the kind described in EPA No. 178831, the diameters of the smallest pores may be as low as 2 nm.

These pore diameters are typically comparable to or less than the mean free paths of gas molecules under the conditions of use. For example, the mean free paths of oxygen and hydrogen at standard temperature and pressure are 60 nm and 120 nm respectively. Under these conditions the flow of gas in the pores follows significantly different physical laws than for conventional conditions in larger tubes. Surface effects dominate and most collisions of gas molecules occur with the pore walls rather than with other gas molecules. An analysis of such behaviour was first carried out by M. Knudsen (An. Physik., 28, (1909) page 75). Under most conditions, gas passage through the pores of anodic aluminium oxide membranes is not by viscous (Newtonian) flow, but either by Knudsen flow, or by diffusion along the solid surface bounding the pore. These features have important implications for reactant/catalyst contact when the membrane catalyst supports are used in a flow-through mode.

A deposit of a catalytically active material may be uniform along the length of each pore, or may be concentrated at one end. When the catalyst support is operated in a flow-through mode, it is advantageous for the catalyst to be deposited adjacent the second or downstream surface of the membrane. This helps to ensure that any back-diffusion of reaction products to the first or upstream side of the membrane is minimised. Catalysts may also be present on the first or second surface of the membrane, but this is immaterial because the surface area of the pores is many times greater than the external surface of the membrane.

The nature of the catalyst is not critical. Aluminium oxide is itself a catalyst for certain dehydration and dehydrogenation reactions, and for such reactions the anodic oxide membranes may be used without further treatment. More usually, a deposit of another catalytically active material will be present within the pores of the membrane. There follows, by way of example, a list of different classes of catalysts which may be used and the types of reaction catalysed by them.

| CLASS | FUNCTION | EXAMPLES |
|---|---|---|
| Metals | hydrogenation dehydrogenation hydrogenolysis oxidation | Fe, Ni, Pd, Pt, Ag |
| Semiconducting oxide, sulphides | oxidation dehydrogenation desulphurization (hydrogenation) | $NiO$, $ZnO$, $MnO_2$, $Cr_2O_3$ $Bi_2O_3$—$MoO_3$, $WS_2$ |
| Insulating oxides | dehydration | $Al_2O_3$, $SiO_2$, $MgO$ |
| Acids | polymerization isomerization cracking alkylation | $H_3PO_4$, $H_2SO_4$, $SiO_2$—$Al_2O_3$ |
| Enzymes | various | Horse radish peroxidase |

More than one catalyst may be present, either in the form of intermingled deposits, or in sequence along the pores so that reactant gases contact first one and then another catalyst during their passage through the pore.

Many techniques are available for providing catalyst deposits in the pores of anodic oxide membranes. In a preferred technique, the membrane is simply contacted with a solution containing the catalyst. Capillary forces draw the solution into the pores and the catalyst deposit may be formed by absorption, impregnation, deposition or precipitation followed by evaporation of the solvent. Techniques to confine the catalyst to a particular region of the pores are available, for example, the pores may be prewetted with the solvent to minimise entry of catalyst solution, or the solution may be made viscous to slow down its rate of entry into the pores. Aqueous solutions of chloroplatinic acid may be used in these techniques to form catalytic deposits of platinum metal. Another technique involves contacting the membrane with a gas containing the catalytic material. For example, nickel carbonyl gas may be used to form nickel metal deposits in the membrane pores. These and other techniques are well known in the catalyst art.

Yet another approach involves varying the nature of the anodising electrolyte. It is known that the acid anion from the electrolyte is incorporated into anodic oxide material effectively doping the oxide, which is likely to change its activity or as catalyst support. Ions which may be introduced in this way include chromate, tungstate, molybdate and arsenate.

The fluid reactants and reaction products of the catalysed reaction are generally in the gas phase.

Catalysed reactions are preferably performed using these membranes in the flow-through mode. That is to say, at least one fluid reactant is presented to a first (upstream) surface of an anodic oxide membrane catalyst support, and a reaction product is recovered from a second (downstream) surface of the support. Although different reactants can be presented to opposite surfaces of the membrane, it is preferred that all reactants be presented to the first surface. This enables one or more reaction products to be recovered from the second surface, and provides an excellent separation of one or more reactants from reaction products. Passage of reactants through the pores may be assisted by a pressure difference across the membrane. The flow rate through the pores can be controlled, by means of the pressure difference, temperature and other factors, so as to provide a desired contact time between reactant gases and catalyst. Since gas flow is systematic, and not random as in conventional supported catalyst systems, this control over contact time can be exercised rather precisely, which may be important in achieving selectivity of the catalysed reaction. The catalyst support may be in the form of a flat membrane. Alternatively, ribbed or tubular membranes may provide greater catalyst surface area per unit volume.

Catalyst devices with several membranes in series, which may have the same or different catalytic sites, are also envisaged.

The device and method of this invention have many advantages over conventional catalysts supported on porous supports:

(a) When operated in the flow-through mode, a high degree of separation of reaction products from reactants is achieved. To the best of applicants knowledge, no conventional supported catalyst system provides for separation of reaction products from reactants.

(b) Because the pores are so small, passage of gases is essentially by diffusion and/or Knudsen flow. As a result, gas/catalyst contact is much better than can be achieved in larger pores with bulk flow of reactants. The turnover frequency, that is to say the number of molecules reacting per catalyst site per unit time, is likely to be greater than for conventional catalysts.

(c) It is an advantage to have an asymmetric membrane wherein the catalyst is held on a high surface area within a very thin skin, as this provides a large catalytic surface area per unit volume of support.

(d) Because gas flow through the membrane pores is systematic and not random, accurate control of gas/catalyst contact time is possible. This offers advantages in terms of selectivity in some reactions. A controlled contact time may prevent side reactions so, for example, the carbon monoxide/hydrogen reaction may be controlled to give a narrower range of hyrocarbon products. Similarly using transition metal dehydrogenation catalysts, a narrow range of olefin products may be obtained.

(e) Many gas reactions, such as oxidation reactions, are highly exothermic. The use of inorganic membranes as catalyst supports permits a high rate of heat transfer, and thus a high through-put of reactant gas.

(f) Catalyst sites often become dirty or blocked. For example, catalysts for cracking hyrdocarbons rapidly become loaded with carbon during use. Inorganic membranes have the advantage of easy cleaning compared with other porous catalyst supports.

BRIEF DESCRIPTION OF THE DRAWING

Reference is directed to the accompanying drawing, which is a section through a catalyst device according to the invention.

In the Examples which follow, except Example 4, comparative experiments were performed using membranes not containing deposits of catalytically active material, to check for any background catalytic activity in the equipment as a whole. The results quoted are corrected for any such background activity shown.

EXAMPLE 1

Three porous anodic aluminium oxide membranes were used for this demonstration of the invention:

1. An asymmetric membrane as described in EPA No. 178831 with a system of larger pores of 250 nm diameter extending from one face and a system of smaller pores extending in from the other face and interconnecting with the system of larger pores.

2. A symmetrical membrane with parallel cylindrical pores 250 nm in diameter.

3. A symmetrical membrane with parallel cylindrical pores 80 nm in diameter.

Each membrane was treated in the same way to provide a deposit of a catalytically active material within the pores. A 0.01 M solution of chloroplatinic acid ($H_2PtCl_6$) in acetone was sprayed onto the membrane. After 30 seconds, the whole membrane was rinsed and immersed in pure acetone, and was thereafter dried in air for two hours at 320° C. The deposit was reduced to platinum metal by flowing pure hydrogen gas over the membrane for two hours at 350° C. By this treatment, the platinum metal was introduced into the pore asymmetrically being highly concentrated towards the ends of the pores facing the surface onto which the solution had been sprayed. In the case of membrane 1, this surface was the wide pore surface.

The drawing illustrates a catalyst device incorporating the membrane. The membrane 10 is positioned horizontal with a first face 12 facing upwards and a second face 14 facing downwards. Adjacent the first face is an upstream region 16 with an entry aperture 18 and an exit aperture 20 for reactant gases. Adjacent the second face is a downstream region 22 with an entry aperture 24 for carrier gas and an exit aperture 26 for reaction products. The thickness of the membrane and the size of the pores are greatly exaggerated in relation to the rest of the apparatus. The catalyst (not shown) is concentrated adjacent the second face.

The reaction chosen to demonstrate the system is the oxidation of two molecules of carbon monoxide by one molecule of oxygen to give two molecules of carbon dioxide. In all experiments, the temperature of the catalyst device was maintained at 192° C. and the pressure difference across the membrane was zero.

In a first experiment, a reactant gas supply was introduced into the system at 18, containing 25 or 50 or 100 ml/min of argon, 25 ml/min of oxygen and X ml/min of carbon monoxide. A flow of argon sufficient to maintain a zero Ar partial pressure difference across the membrane was introduced into the system at 24. The amounts of carbon monoxide and carbon dioxide in the effluent gases at 20 and 26 were determined.

In a second experiment, the direction of flow was reversed. The reactant gas containing oxygen and carbon monoxide was introduced into the system at 24, and pure argon introduced at 18.

In both experiments, the oxygen was used in excess over carbon monoxide. In both cases, no carbon monoxide was detected in the effluent gases on the downstream side of the membrane. In other words, all carbon monoxide entering pores in the membrane had reacted with oxygen to give carbon dioxide.

The ratio of carbon dioxide found in the downstream effluent to that found in the upstream effluent is reported for the various reaction conditions in the following table. Each box of the table contains two figures; the first relates to the first experiment in which the reactant gases were introduced into the system at 18; the second figure relates to the second experiment in which the reactant gases were introduced at 24. It is apparent that a substantial degree of separation of the reaction product carbon dioxide from the unreacted reaction gases was achieved in the first experiment where the catalyst was positioned towards the downstream ends of the pores. But little or no separation of carbon dioxide from reactant gases was achieved in the second experiment where the catalyst was deposited at the upstream ends of the pores. Ratio of $CO_2$ in downstream/upstream effluent

| | Ratio of $CO_2$ in downstream/upstream effluent | | |
|---|---|---|---|
| Membrane | 25 ml/min Ar | 50 ml/min Ar | 100 ml/min Ar |
| 1 | 1.17/1.05 | 1.18/0.94 | 1.21/1.02 |
| 2 | 1.29/1.08 | 1.32/1.04 | |
| 3 | 1.37/1.03 | 1.26/1.03 | 1.29/1.05 |

EXAMPLE 2

This experiment demonstrates the effect of altering the downstream side gas flow rate, always at zero carrier gas pressure difference across the membrane. The experiment was performed as Example 1, using membrane 1 with the catalyst located in the system of larger pores adjacent the downstream side.

The experiment was carried out with 50 ml/min Ar, 25 ml/min $O_2$ and 5–25 ml/min CO over the upstream surface (smaller pore system of the membrane). By systematically increasing the Ar flow-rate over the bottom (downstream) surface the separation factor was increased significantly —always with zero Ar partial pressure difference before entry of $O_2$ and CO into the top chamber.

| Ar flow rate over downstream surface (ml/min) | Ratio of $CO_2$ in downstream/upstream effluent |
|---|---|
| 50 | 1.31 |
| 100 | 1.96 |
| 150 | 3.60 |
| 200 | 6.15 |
| 250 | 10.22 |
| 300 | 15.58 |
| 350 | 19.40 |

| Ar flow rate over downstream surface (ml/min) | Ratio of $CO_2$ in downstream/upstream effluent |
|---|---|
| 400 | 26.30 |

These data show that equal Ar flow-rates either side of the membrane give a separation factor of 1.31:1. There is a highly significant effect of downstream carrier gas flow-rate.

EXAMPLE 3

A symmetrical membrane with parallel pores approximately 200 nm in diameter was prepared so as to include a dispersion of Pt particles substantially as in Example 1. The concentration of chloroplatinic acid in acetone was 0.005 M and was sprayed onto one side of the membrane. This was dried in air for two hours at 320° C. The deposit was reduced to Pt metal by flowing pure hydrogen gas over the membrane for two hours at 350° C. The resulting catalyst particles were thereby concentrated to the side of the membrane originally sprayed by the chloroplatinic acid solution. Another identical membrane sample was treated in exactly the same way but using a 0.005 M solution of ammonium hexachloroosmate $(NH_4)_2OsCl_6$).

This resulted in an asymmetric dispersion of Os particles.

The aim of subsequent experiments was to prove that the following reactions would take place over both Pt and Os particles.

A. Dehydrogenation of ethane to hydrogen and ethene.
B. Hydrogenolysis of ethane to methane.
C. Hydrogenation of ethene to ethane.

For all six experiments the initial carrier gas (Argon) conditions were identical; 25 ml/min Ar flowrate over the top surface, 50 ml/min Ar flowrate over the bottom surface. For both membranes the catalyst particles were concentrated towards the bottom surface and there was no partial pressure difference of Ar gas across the membrane. The membranes and gas entering the experimental chamber were maintained at 200° C.

A. Dehydrogenation of Ethane

Pure ethane gas was added to the carrier gas flowing over the top surface of the membrane. The effluent from both the upstream and downstream of the experimental rig was analysed separately by a quadruples mass spectrometer. With just the Ar carrier gas no peaks in the mass spectrum attributable to hydrogen or ethene were detected. Immediately the ethane was introduced into the top gas stream, peaks corresponding unambiguously to the cracking spectra of hydrogen and ethene were detected in both effluent streams. By increasing the flow rate of the carrier gas on the downstream side of the membrane the hydrogen and ethene products of the dehydrogenation reaction could be concentrated into the downstream chamber in a manner analogous to the effect of downstream carrier gas flowrate shown in Example 2.

B. Hydrogenolysis of Ethane

Pure hydrogen gas at the rate of 50 ml/min was added to the mixture of 25 ml/min of Ar and 10 ml/min ethane, again with 50 ml/min of pure Ar and flowing over the lower face of the membrane. In this instance new peaks were found in the mass spectrum corresponding unambiguously to the presence of methane in both upstream and downstream effluents. The methane product could be concentrated in the downstream effluent by increasing the downstream carrier gas flowrate again analogous to the effect of downstream carrier gas flowrate shown in Example 2.

C. Hydrogenation of Ethene to Ethane

In this instance 25 ml/min of Ar was caused to flow over the top surfaces of the membranes with an additional 10 ml/min of pure ethene gas and 50 ml/min of pure hydrogen gas. The downstream Ar carrier gas flow rate was 50 ml/min. Before ethene and hydrogen additions were made to the upstream feed no peaks in the mass spectrum corresponding to ethane were found in the mass analysis of the upstream and downstream effluents. However, immediately after the addition of hydrogen and ethene new peaks appeared corresponding unambiguously to the presence of the ethane product of the hydrogenation reaction. The ethane product could be concentrated in the downstream effluent by increasing the downstream carrier gas flowrate, again analogous to the effect of downstream carrier gas flowrate shown in Example 2.

EXAMPLE 4

An asymmetric membrane produced as described in EPA No. 178831, with a system of larger pores approximately 200 nm in diameter extending in from one face and a system of smaller pores extending in from the other face, was placed into the experimental apparatus with no deliberate addition of catalyst particles. The temperature of the apparatus was maintained at 200° C. The apparatus was operated in such a manner as to force all of the gas that entered the top chamber to flow through the membrane. A proportion of the effluent gas from the downstream side of the membrane was passed into a quadruples mass spectrometer for analysis. With pure Ar flowing into the system at a rate of 25 ml/min only peaks corresponding to the cracking spectrum of Ar and residual water, carbon monoxide and carbon dioxide from the vacuum system were found in the mass spectrum. When the Ar gas was allowed to flow through pure liquid isopropanol at 50° C. so as to generate a mixture of Ar and isopropanol vapour, new peaks appeared in the mass spectrum and the peaks corresponding to the cracking spectrum of water increased in size. The new peaks were unambiguously identified as resulting from propene and residual isopropanol. Thus the isopropanol had been dehydrated to propene solely by the action of alumina that comprises the structure of the membrane. Under these conditions this experiment showed that the material of the membrane itself acts as an efficient acid catalyst as described, for example, in "Organic Chemistry" (R. T. Morrison and R. N. Boyd; Allyn and Bacon, Inc., Boston, 1973 p166). This reaction is known to occur in heated concentrated liquid sulphuric or phosphoric acids or over heated alumina with the alumina serving as a solid Lewis acid. The same experiment was carried out using a symmetrical membrane with approximately 200 nm pore diameter and again gave evidence of the dehydration reaction to propene and water.

EXAMPLE 5

A membrane supported catalyst was made by soaking a symmetrical capillary pore membrane with pore diameter of approximately 200 nm in an aqueous solution of 0.1 M ammonium dichromate $((NH_4)_2CrO_4)$. This compound is known to thermally decompose to chromium oxide ($Cr_2O_3$). This was carried out by heating the membrane in flowing pure nitrogen gas for two hours at 350° C. Under the same experimental conditions as for Example 3 the supported chromia catalyst was shown to dehydrogenate ethane gas to hydrogen and ethene at 200° C. In this case the supported chromia catalyst covered all the surfaces of the alumina support in equal concentration.

EXAMPLE 6

A composite ceramic membrane was prepared according to Example 2 of GB Patent Application No. 8704252 (Feb. 24, 1987). This consisted of a support material, asymmetric membrane produced as described in EPA No. 178831, with a layer of tortuous pore alumina produced by the dehydration of boehmite gel applied initially as a sol. The composite thus consisted of 50 micron thick asymmetric anodic film membrane with widest pore size approximately 200 nm, on top of the asymmetric pore side of which was an approximately 0.2 micron thick tortuous pore layer with mean pore size of approximately 5 nm, as determined by transmission electron microscopy. This was sprayed from the tortuous pore side with a 0.2M solution of chloroplatinic acid in acetone. The chloroplatinic acid was reduced to Pt metal as in Example 1. The effectiveness of the membrane as a catalyst support was tested by the hydrogenation of ethene to ethane reaction described in Example 3 with the ethene/hydrogen reactant gases being supplied from the parallel pore side of the membrane.

With 50 ml/min hydrogen plus 10 ml/min ethene added to 25 ml/min argon carrier gas, and 50 ml/min argon carrier gas flowing over the downstream side of the membrane, ethane product was detected in the upstream and downstream effluents by mass spectrometry. Increase of the carrier gas flowrate over the downstream side of the membrane resulted in an increased proportion of the total ethane product being concentrated in the downstream effluent, in the same manner as demonstrated in Example 2. The reaction temperature was 200° C.

Further experiments were carried out whereby a mixture of hydrogen gas and ethene gas with no argon carrier gas was caused to flow through the membrane, from the wide pore side through the supported Pt catalyst material. There was no argon carrier gas flowing over the Pt side of the membrane In this way it was shown that with a constant hydrogen gas flowrate of 50 ml/min additions of up to 50 ml/min of ethene reacted to form ethane with a residual level of ethene which remained approximately constant in proportion to the quantity of ethane, i.e. this catalyst was able to achieve chemical equilibrium at least up to 50 ml/min ethene flowrate and with sufficient hydrogen gas to be greater than or equivalent to stoichiometric. When the hydrogen level was reduced to sub-stoichiometric, the ethene/ethane ratio of the effluent increased as would be expected on the basis of the stoichiometry of the reaction. This type of membrane catalyst support offered the highest catalytic efficiency, as would be expected from its extremely high total surface area/unit mass concentrated in the sol-gel alumina layer.

EXAMPLE 7

A porous ceramic membrane, not an anodic oxide membrane, was made by a tape casting technique. Suspension of alumina particles and a small amount of magnesia grain growth inhibitor was made in a mixture of trichloroethylene, ethanol, corn oil, polyvinylbutyral and polyethyleneglycol. The final composition (wt %) after blending and deaerating was: 55.08% alumina, 0.14% magnesia, 1.17% corn oil, 26.14% trichloroethylene, 10.28% ethanol, 2.8% polyvinylbutyral, 4.39% polyethyleneglycol.

This was spread onto a glass plate using a doctor blade, dried and calcined at 1200° C. to give a tortuous pore membrane approximately 200 microns thick with mean pore size, as determined by mercury intrusion porosymetry, of approximately 0.2 microns. Chloroplatinic acid solution was sprayed onto this as in Example 6 and reduced to Pt metal as in Example 1.

The membrane was tested by the hydrogenation of ethene to ethane reaction as in Example 6. Ethane product was detected in the upstream and downstream effluents by mass spectrometry. Increased concentration of ethane product could be achieved by increasing the Ar carrier gas flowrate over the bottom (Pt containing side) of the membrane as in Example 2.

EXAMPLE 8

This Example used asymmetric membranes produced as described in EPA No. 178831.

0.02 ml alkaline phosphatase solution (10 mg/ml) was spread on the surface of a conventionally pretreated membrane by means of pipette tip. Excess buffer was evaporated from the membrane at 4° C. Binding of the enzyme molecules was achieved by the addition of a glutaraldehyde solution (2.5% of the stock 25% solution in a 0.02 M phosphate buffer pH 6.8) on each side of the membrane. Membranes were left at 4° C. overnight to allow reticulation (cross-linking) to take place.

Membranes were then rinsed in phosphate buffer pH 6.8 until all the unreacted molecules had been removed (monitored by light absorption at 280 nm). The membranes were stored in 0.025 M glycine buffer pH 9.6 containing 1 mM $MgCl_2$ and 0.1 mM $ZnCl_2$, at 4° C.

The treated membrane was placed in petri dish. 6 ml of a 5.5 mol/l p-nitrophenyl phosphate substrate was added to the dish, and the solution cycled continuously through a flow-through cuvet mounted in a spectrophotometer. The increase in absorbance at 400 nm of the solution was measured over a five minute period to determine the amount of enzymatic conversion of the substrate to p-nitrophenol, by the alkaline phosphatase bound to the membrane.

Results obtained were semi-quantitative only, and expressed as the change in absorbance per unit time (DA/min) for comparison purposes only.

Initial experiments showed that pumping a solution of p-nitrophenyl phosphate substrate through a treated membrane, and subjected to a pressure of 50 kPa, resulted in steady flow and an obvious colour change in the filtrate, (colourless to yellow) indicating that enzymatic activity was present. A preliminary evaluation of enzyme activity and flowrate was made and is presented in the table below.

| Membrane | Filtrate Enzyme Activity (DA/min) | Flowrate (ml/min) |
| --- | --- | --- |
| Treated | 0.533 | 4.84 |
| Untreated | | 12.50 |

EXAMPLE 9

A composite ceramic membrane was prepared substantially as in Example 6, except that the chloroplatinic acid solution spray was applied from the wide capillary pore side of the membrane. In this way, Pt catalyst particles covered the internal surfaces of the membrane from the wide capillary pores, through the asymmetric region of the anodic support membrane and part way into the tortuous pore membrane component produced by the sol-gel alumina application. This left the part of the sol-gel alumina component that comprised one face of the membrane free of Pt particles. Argon carrier gas was fed at the rate of 50 ml/min over the top, small tortuous pore, face of the membrane and at the rate of 100 ml/min over the bottom, wide capillary pore, face of the membrane. There was no partial pressure difference of Argon across the membrane. The 50 ml/min Argon stream was allowed to flow through liquid n-hexane before entering the reaction cell. Care was taken to control the concentration of n-hexane vapour in this Argon stream by minimising the Argon bubble size by use of a porous glass sparger, and through thermostatic control of the temperature of the water bath in which the vessel containing the n-hexane was kept.

Analysis of the upstream and downstream effluents by mass spectrometry showed the presence of ions that were unambiguously identified as being part of the cracking spectrum of benzene. Many other additional ions were present in the spectrum in addition to those that were part of the cracking pattern of a pure n-hexan vapour test sample. These could not be identified unambiguously. It is well known that benzene can be produced from n-hexane via a mechanism based on the simultaneous operation of two types of catalysts each with a different function. A description of this mechanism is given, for example, in "Chemistry of Catalytic Processes" (B. C. Gates, J. R. Katzer and G. C. A. Schmit, McGraw-Hill, New York, 1979). The Pt metal sites can catalyze dehydrogenation of paraffins to olefins. Acid sites on the support can then catalyze isomerization, cyclization and hydrocracking these olefins through carbonium-ion mechanisms. One result is conversion of the straight chain saturated hydrocarbon to an unsaturated aromatic hydrocarbon as found experimentally in this example.

This illustrates that the membrane operated as a bifunctional catalyst, that is to say, the Pt metal particles and acid sites on the support acted simultaneously as catalysts. Proof that the catalysts operated initially by the dehydrogenation step was found by (1) observing that hydrogen gas was produced in each effluent stream when pure n-hexane reactant was fed in, and (2) by observing that when hydrogen gas was added to the Argon/n-hexane reactant feed, the level of the unknown and benzene peaks in the mass spectrum decreased considerably. However, even at levels of hydrogen addition of 100 ml/min the benzene product was still found at just detectable concentration.

We claim:

1. An inorganic membrane having first and second surfaces with pores extending through the membrane from one surface to the other, wherein a deposit of a catalytically active material is present within the pores, the deposit being concentrated in the ends of the pores adjacent one surface of the membrane.

2. A membrane as claimed in claim 1, having a system of larger pores extending in from one surface and interconnecting with a system of smaller pores extending in from the other surface.

3. A membrane as claimed in claim 2, which is a composite membrane comprising an inorganic membrane with relatively larger pores and an overlying inorganic film with relatively smaller pores.

4. A membrane as claimed in claim 2, wherein the catalytically active material is present in the smaller pores.

5. A membrane as claimed in claim 2, wherein the membrane is of aluminium oxide.

6. A membrane as claimed in claim 5, wherein the membrane is or comprises an anodic aluminium oxide membrane.

7. A catalyst device comprising an inorganic membrane having first and second surfaces with pores extending through the membrane from one surface to the other, wherein a deposit of catalytically active material is present within the pores of the membrane and is concentrated at the ends of the pores adjacent the second surface of the membrane, means for presenting to the first surface a fluid reactant of a chemical reaction able to be catalysed by the said membrane and means for recovering from the second surface a fluid product of the catalysed reaction.

8. A catalyst device as claimed in claim 7, wherein the membrane is of aluminium oxide.

9. A catalyst device as claimed in claim 8, wherein the membrane is or comprises an anodic aluminium oxide membrane.

10. A catalyst device as claimed in claim 7, wherein the membrane is an asymmetric membrane having a system of larger pores extending in from one face and interconnecting with a system of smaller pores extending in from the other face.

11. A catalyst device as claimed in claim 10, wherein a deposit of catalytically active material is present within the system of larger pores.

* * * * *